(12) United States Patent
Jay et al.

(10) Patent No.: US 7,783,022 B1
(45) Date of Patent: Aug. 24, 2010

(54) APPARATUS AND METHOD FOR SPEAKER IDENTIFICATION DURING TELECOMMUNICATION CALLS

(75) Inventors: Dylan Jay, McMahons Pt (AU); Rohan Lenard, Birchgrove (AU)

(73) Assignee: Avaya Inc., Basking Ridge, NJ (US)

( * ) Notice: Subject to any disclaimer, the term of this patent is extended or adjusted under 35 U.S.C. 154(b) by 1564 days.

(21) Appl. No.: 10/821,725

(22) Filed: Apr. 9, 2004

(51) Int. Cl.
*H04M 3/42* (2006.01)
*H04L 12/16* (2006.01)
*H04Q 11/00* (2006.01)

(52) U.S. Cl. .................... 379/202.01; 370/260
(58) Field of Classification Search ............ 379/202.01, 379/351–356; 370/260, 261, 263, 264, 265, 370/266, 271, 352; 704/270, 231; 381/81
See application file for complete search history.

(56) References Cited

U.S. PATENT DOCUMENTS

| | | | | |
|---|---|---|---|---|
| 4,658,425 A * | 4/1987 | Julstrom | .................. | 381/81 |
| 5,450,481 A * | 9/1995 | Penzias | ................. | 379/202.01 |
| 6,457,043 B1 * | 9/2002 | Kwak et al. | ................. | 709/204 |
| 6,801,612 B2 * | 10/2004 | Malcolm et al. | ........ | 379/202.01 |
| 6,826,159 B1 * | 11/2004 | Shaffer et al. | ................ | 370/260 |
| 6,853,716 B1 * | 2/2005 | Shaffer et al. | .......... | 379/202.01 |
| 7,099,448 B1 * | 8/2006 | Laniepce et al. | ....... | 379/202.01 |
| 2002/0091517 A1 * | 7/2002 | Frank et al. | .................. | 704/231 |
| 2003/0081751 A1 * | 5/2003 | Berstis | .................. | 379/202.01 |
| 2003/0125954 A1 * | 7/2003 | Bradley et al. | .............. | 704/270 |
| 2004/0013252 A1 * | 1/2004 | Craner | .................. | 379/142.01 |
| 2005/0135583 A1 * | 6/2005 | Kardos | .................. | 379/142.01 |

OTHER PUBLICATIONS

International Telecommunications Union, ITU-T H.245 Series H, Jul. 1997, pp. 27-32.*

* cited by examiner

*Primary Examiner*—Ahmad F Matar
*Assistant Examiner*—Sonia Gay
(74) *Attorney, Agent, or Firm*—John C. Moran (57) ABSTRACT

An apparatus and method utilize information gathered by the telecommunication terminals that are part of the telecommunication conference to assist in the identification of the speaker at any point in time during a telecommunication conference.

11 Claims, 8 Drawing Sheets

APPARATUS AND METHOD FOR SPEAKER IDENTIFICATION DURING TELECOMMUNICATION CALLS

TECHNICAL FIELD

The present invention relates to telecommunication conferences, and, in particular, to the identification of speakers on the telecommunication conference.

BACKGROUND OF THE INVENTION

The desirability of doing speaker identification on multi-party telecommunication conferences is well recognized in the prior art. It is desirable to do speaker identification during multimedia telecommunication conferences such as video so that the speaker video image can be highlighted allowing the other parties to the conference to see the expression on the speaker's face more clearly. In addition, if a record is to be made of the telecommunication conference either audio or audio text, it is desirable to be able to identify the speaker of each segment of the recorded conference. In some prior art systems, the speaker was assumed to be producing the voice stream that had the loudest audio signal. However, this technique fails if one of the parties was in a noisy environment such as in an automobile or in a room with a loud air conditioning system. Other prior art systems have utilized signal processing on all of the audio streams coming into the conference to determine who the speaker or speakers were at any instant of time during the telecommunication conference. The drawback of this system is that a large amount of signal processing must be performed in order to identify one or more speakers in a telecommunication conference.

SUMMARY OF THE INVENTION

The above mentioned problems are solved and a technical advance is achieved in the art by an apparatus and method that utilize information gathered by the telecommunication terminals that are part of the telecommunication conference to assist in the identification of the speaker at any point in time during a telecommunication conference.

DETAILED DESCRIPTION

Figure 1:
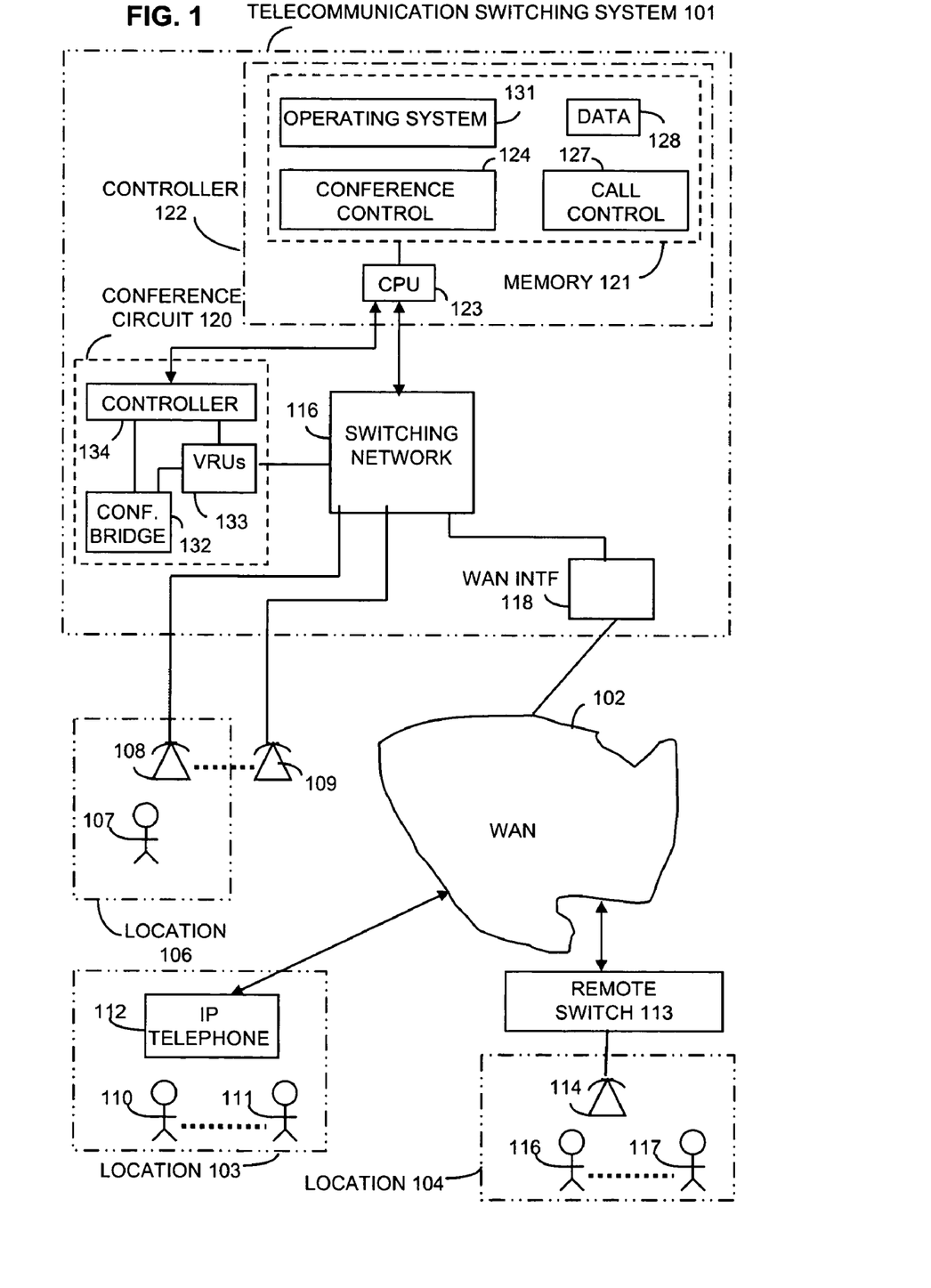
FIG. 1 illustrates, in block diagram form, an embodiment of the invention.

FIG. 1 illustrates, in block diagram form, an embodiment for implementing the invention. Telecommunication switching system 101 is providing a telecommunication conference for locations 103-106. Overall control is provided by controller 122 with the switching being performed by switch network 119. Controller 122 functions by CPU 123 executing programs and applications out of memory 121. Overall control of the operations performed by controller 122 is done by the execution of operating system 131. Data necessary for the operations of controller 122 is stored in data 128. Call control 127 provides the overall control of telephony operations. Control of conference operations is performed by the execution of conference control 124. The conferencing operations are performed by conference circuit 120. Controller 134 provides the overall control of conference circuit 120 based on messages received from controller 122 and voice recognition units (VRUs) to control the functions of conference bridge 132 and also to control VRUs 133. The functions of conference circuit 120 are similar to those described in U.S. patent application Ser. No. 10/393,794, entitled "Apparatus and Method for Providing Advanced Communication Conferencing Operations", filed Mar. 18, 2003. This U.S. patent application, which is owned by the same assignee as the present application, is hereby incorporated by reference. Telephones 108-109 are directly connected to switch network 119 using mechanisms well understood by those skilled in the art. Telephones 108-109 can be analog, ISDN, or proprietary digital protocol telephones. For purposes of an illustrative example set forth later, telephone 108 is assumed to be an ISDN or a proprietary digital telephone. IP telephone 112 is interconnected into switch network 119 utilizing wide area network (WAN) and LAN interface 118. The design of LAN interface 118 is well known by those skilled in the art. More details of the interaction of telecommunication switching system 101 with IP telephone 112 and remote switch system 113 via WAN 102 and WAN interface 118 is set forth in U.S. patent application Ser. No. 09/718,909, filed on Nov. 22, 2000, which is owned by the same assignee as the present application and is hereby incorporated by reference. Telephone set 114 for purposes of the following example is assumed to be an analog telephone set and is interconnected to switch network 119 via remote switch 113, WAN 102, and LAN interface 118. Remote switch 113 is described in greater detail in the previously incorporated patent application.

To understand the various embodiments of the invention, please consider the following example. Locations 103-106 are engaged in a telecommunication conference call. The telecommunication conference call can be limited to only audio or can be a combination of audio, video, or text. Location 106 utilizes telephone set 108 to allow participant 107 to participate in the telecommunication conference. Telephone set 108 is a digital telephone set (either ISDN or a proprietary protocol). Telephone set 108 transmits to controller 122 via switch net 119 whether the speaker phone or the hand set is active on telephone set 108. If only participant 107 is part of the conference call, participant 107 normally would be utilizing the handset, and this fact would be transmitted to controller 122 which would relay the information to conference circuit 120. Conference circuit 120 utilizes this information to allow it to use a less complicated speaker identification algorithm since there is only one speaker at location 106. Further, the speaker only has to be determined once during the conference call.

Location 103 has participants 110-111 participating in the telecommunication conference call via IP telephone set 112. IP telephone set 112 transmits the fact that a speaker phone is being utilized to conference circuit 120 via WAN 102, LAN interface 118, and switch network 119 or via the path WAN 102, LAN interface 118, switch network 119, and controller 122. In addition, IP telephone set indicates to conference circuit 120 when it is transmitting audio voice information. In addition, in another embodiment IP telephone set 112 utilizes a simple algorithm to determine when the speaker has changed at location 103. This algorithm does not identify the speaker but rather only that a different participant of participants 110-111 is presently speaking. Conference circuit 120 utilizes the information concerning whether or not there is voice in the audio stream coming from IP telephone set 112 to make the determination whether it is necessary to attempt speaker identification nor not. Conference circuit 120 would utilize the information from IP telephone set 112 that the speaker had changed at location 103 to commence a signal processing algorithm to identify the new speaker. The fact that the speaker change information is transmitted from location 103 allows conference circuit 120 to not to have to continuously perform speaker identification with respect to audio voice information being received from IP telephone set 112.

Location 104 allows participants 116 and 117 to utilize analog telephone set 114 to be part of the telecommunication conference call by utilizing remote switch 113 which creates a path via WAN 102, LAN interface 118, and switch network 119 to conference circuit 120. Remote switch 113 is described in detail in the previously incorporated patent application. Telephone set 114 is utilizing a speaker phone to allow participants 116 and 117 to participate in the telecommunication conference. Remote switch 113 determines when there is audio voice information being received from analog telephone set 114 and signals this fact to conference circuit 120. In addition, remote switch 113 performs a simple identification algorithm to determine when the speaker changes between participant 116 and 117. This information is also transmitted to conference circuit 120 by remote switch 113.

Figure 2:
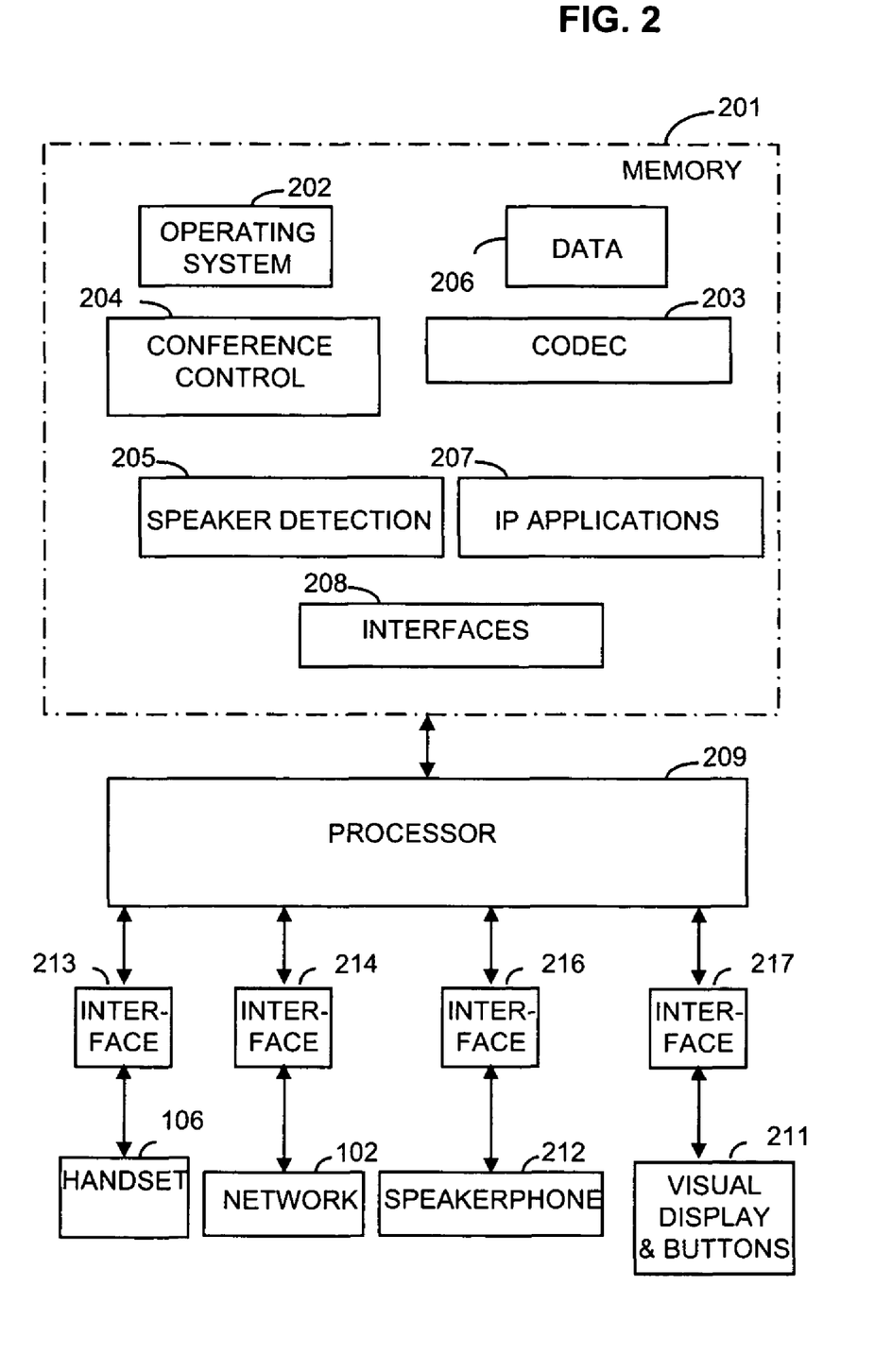
FIG. 2 illustrates, in block diagram form, an embodiment of an IP telephone.

FIG. 2 illustrates, in block diagram form, one embodiment of an IP telephone set such as IP telephone set 112 of FIG. 1. Processor 209 provides the overall control for the functions of IP telephone set 112 by executing programs and storing and retrieving data from memory 201. Processor 209 connects to network 102 via interface 214. Processor 209 interfaces to handset 106 via interface 213 and connects to visual display and buttons 211 via interface 217. Visual display and buttons 211 are all of the indicators, buttons, keypads, and displays that are found on an IP telephone set. Processor 209 performs the operations of IP telephone set 112 by executing the routines illustrated in memory 401. Speakerphone 212 is interface to processor 209 via interface 216. Interfaces 213 and 216 perform the necessary audio to digital conversions. CODEC routine 203 is responsible for encoding and decoding the raw digital information received from interfaces 213 and 216 into packets for transmission via network 102. In addition, packets received from network 102 are decoded into raw digital information and transferred to interfaces 213 and 216 for conversion to audio information for speakerphone 212 or handset 106.

Operating system 202 provides the overall control and necessary protocol operations. Operating system 202 provides all control functions required to implement the TCP/IP protocol as is well known to those skilled in the art. Data is stored in datablock 206. Overall control of the call processing is performed by the IP telephone set 112 under control of IP applications 207 being executed. The communication and control of the various interfaces illustrated in FIG. 2 is provided by interfaces routine 208. Overall control of conferencing is provided by the execution of conference control routine 204. The determination of whether a different person is speaking into the speaker phone of IP telephone set 112 during a conference is determined by the execution of speaker detection routine 205 under overall control of conference control routine 204. When processor 209 during the execution of IP application 207 determines that speakerphone 212 is being utilized, processor 209 starts the execution of conference control routine 204. In turn conference control routine 204 starts the operation of speaker detection routine 205. Speaker detection routine 205 is continuously monitoring the audio information coming from speaker phone 212 via interface 216 to determine if a new speaker has commenced speaking. If speaker detection routine 205 determines that a different speaker is now speaking, speaker detection routine 205 via operating system 202 and interface 214, network 102 sends a message to controller 122 indicating that a different speaker is now speaking on IP telephone 112.

Figure 3:
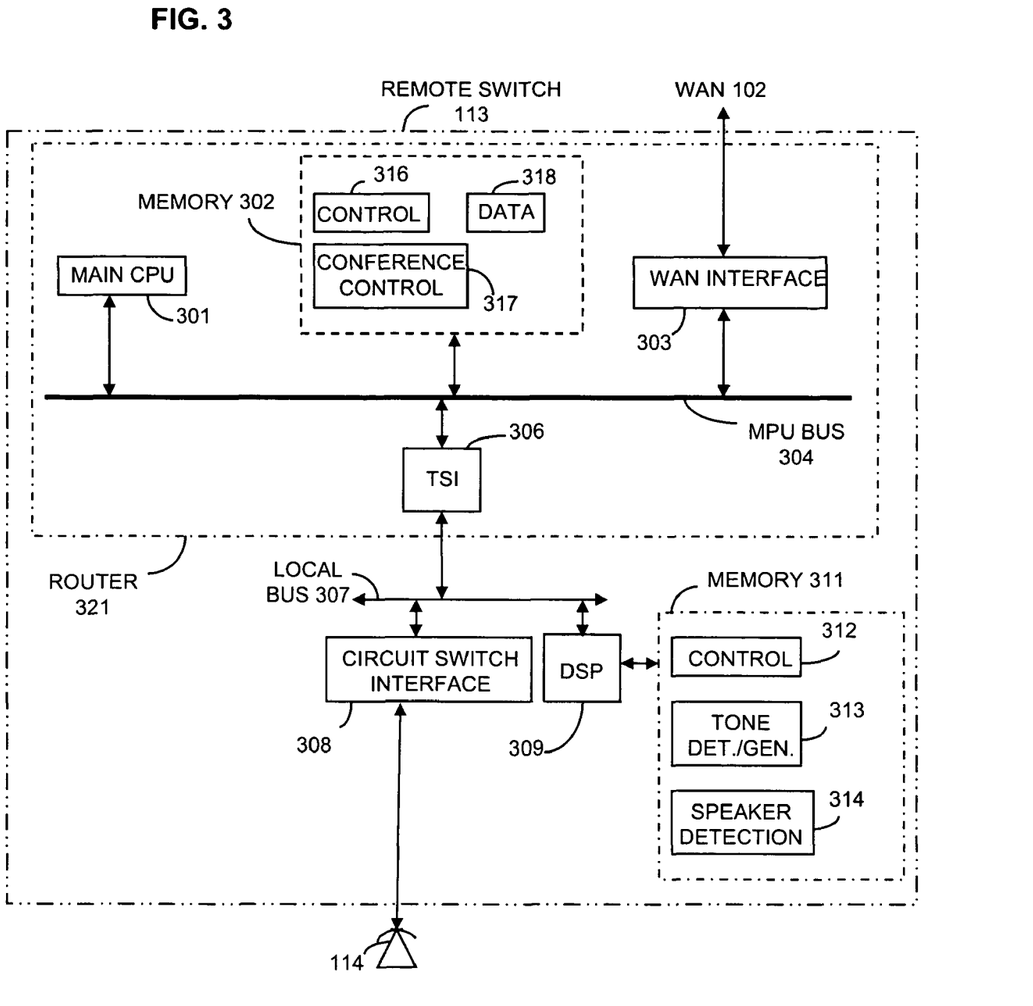
FIG. 3 illustrates, in block diagram form, an embodiment of a remote switch.

FIG. 3 illustrates in greater detail remote switch 113. Digital signal processor, DSP, is controlled by main CPU 301 via MPU bus 304. Router 321 comprises main CPU 301 that provides overall control of remote switch 113. Main CPU 301 executes control software stored in memory 302. Control routine 316 provides the overall control of router 321. Data 318 is utilized to store the various tables and data required for the control function. Control of the conferencing functions is provided by conference control routine 317. Time slot interchange (TSI) 306 provides a mechanism for inter-exchanging time slots on local bus 307 and MPU bus 304. In addition, TSI 306 can be utilized to inter-exchange time slots that are being received from telecommunication terminals such as telephone set 114. This provides remote switch 113 with the capability of performing local circuit switching. WAN interface 303 provides the interface to WAN 102. Bus 304 is the overall informational highway that is used to communicate both control and bearer information within router 321.

DSP 309 is under control of main CPU 301 to perform the necessary coding and conversion task, tone generation and detection, and speaker detection. DSP 309 performs the overall coding and conversion task by executing control routine 312. Tone detection/generation routine 313 is utilized to provide and detect the necessary audio tones from telephone sets such as telephone set 114. Speaker detection routine 314 is utilized to detect when the speaker on a conference call such as speaker 116 or 117 changes and signals this change to main CPU 301. Main CPU 301 in turn activates conference control routine 317 which sends a message to telecommunication switching system 101 via WAN interface 303 and WAN 102.

When a telephone connected to remote switch 113 becomes part of a conference call, controller 122 of telecommunication switching system 101 transmits a message to remote switch 113 indicating this fact. Main CPU 301 is responsive to this message to activate conference control routine 317 which in turn activates DSP 309 to execute speaker detection routine 314. As long as the conference call is active, speaker detector routine 314 monitors the audio information being received from handset 114 to determine when a different speaker is speaking.

Figure 4:
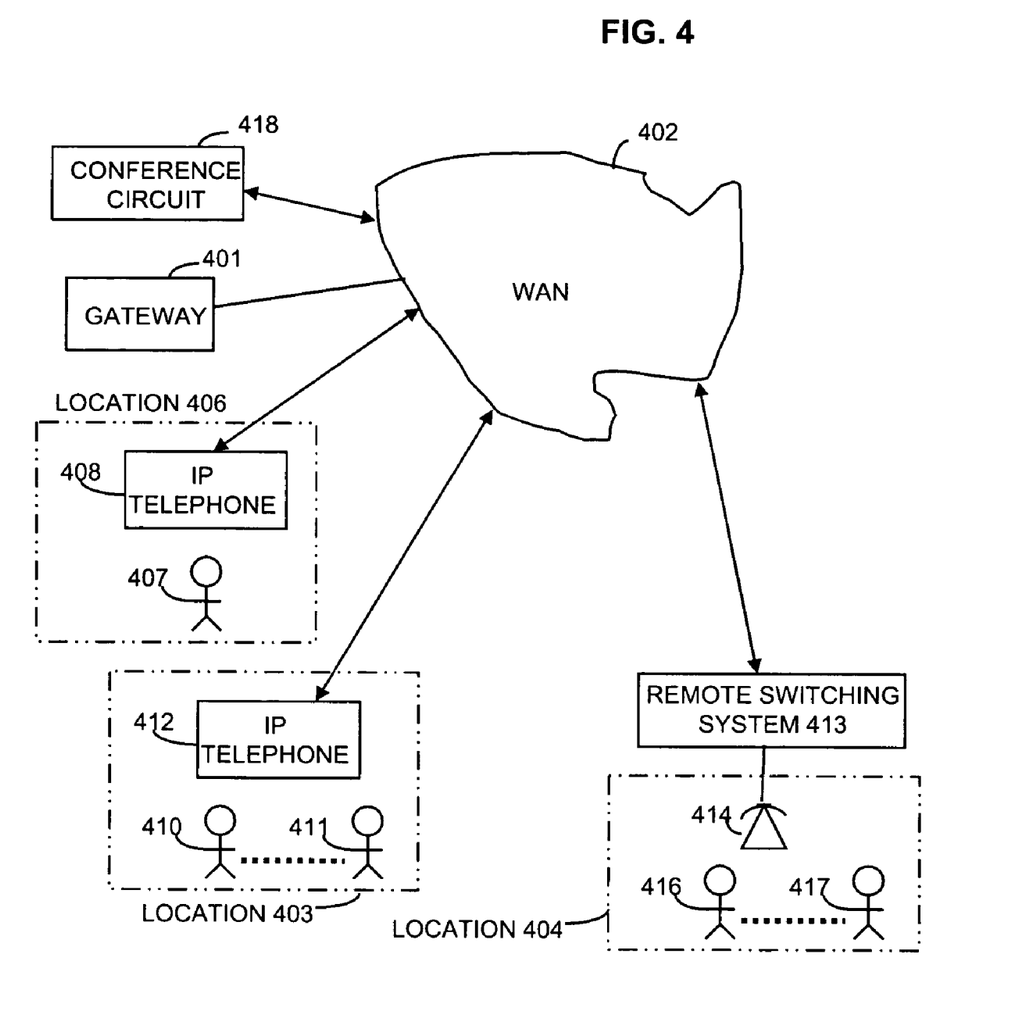
FIG. 4 illustrates, in block diagram form, an embodiment of the invention.

FIG. 4 illustrates another embodiment for implementing the invention. Gateway 401 is controlling the operations of IP telephone 408, IP telephone 412, and remote switch 413 with respect to telecommunication operations by transmission and reception of control information via WAN 402. Analog telephone set 108 has been replaced by IP telephone 408. Conference circuit 418 also receives and transmits information via WAN 402. Conference circuit 418 is under control of gateway 401. Gateway 401 and conference circuit 418 communicate via WAN 402. Gateway 401 performs similar operations to those performed by controller 122 with respect to overall telecommunication control operations and conference control.

Figure 5:
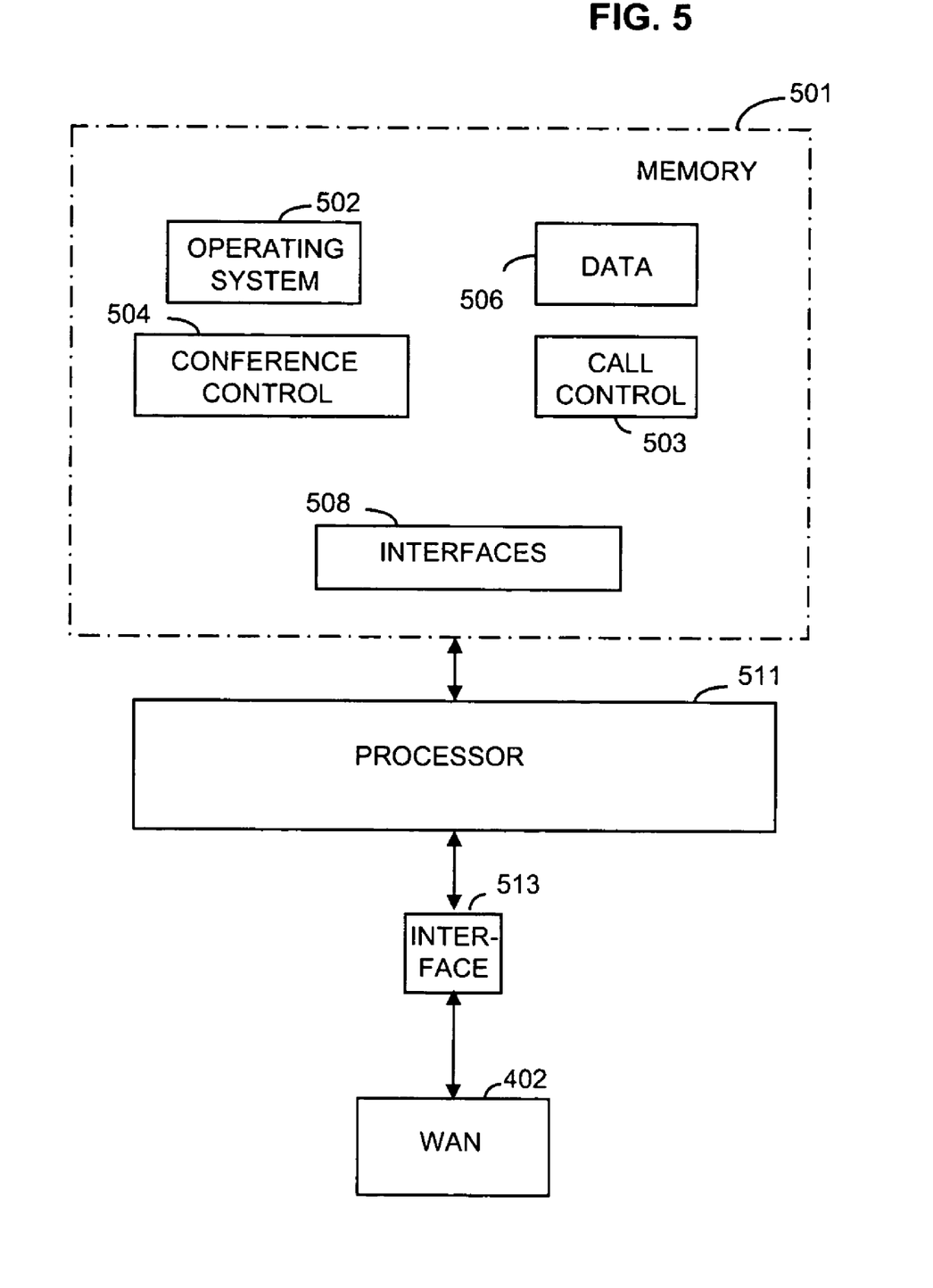
FIG. 5 illustrates, in block diagram form, an embodiment of a PTSN gateway.

FIG. 5 illustrates gateway 401 in greater detail. Processor 511 performs control functions by executing programs and storing and retrieving data from memory 501. Memory elements 502-506 perform similar operations to those described with respect to memory elements 131, 124, 127, and 128 of FIG. 1. Interfaces 508 provide the control for interface 513.

Figure 6:
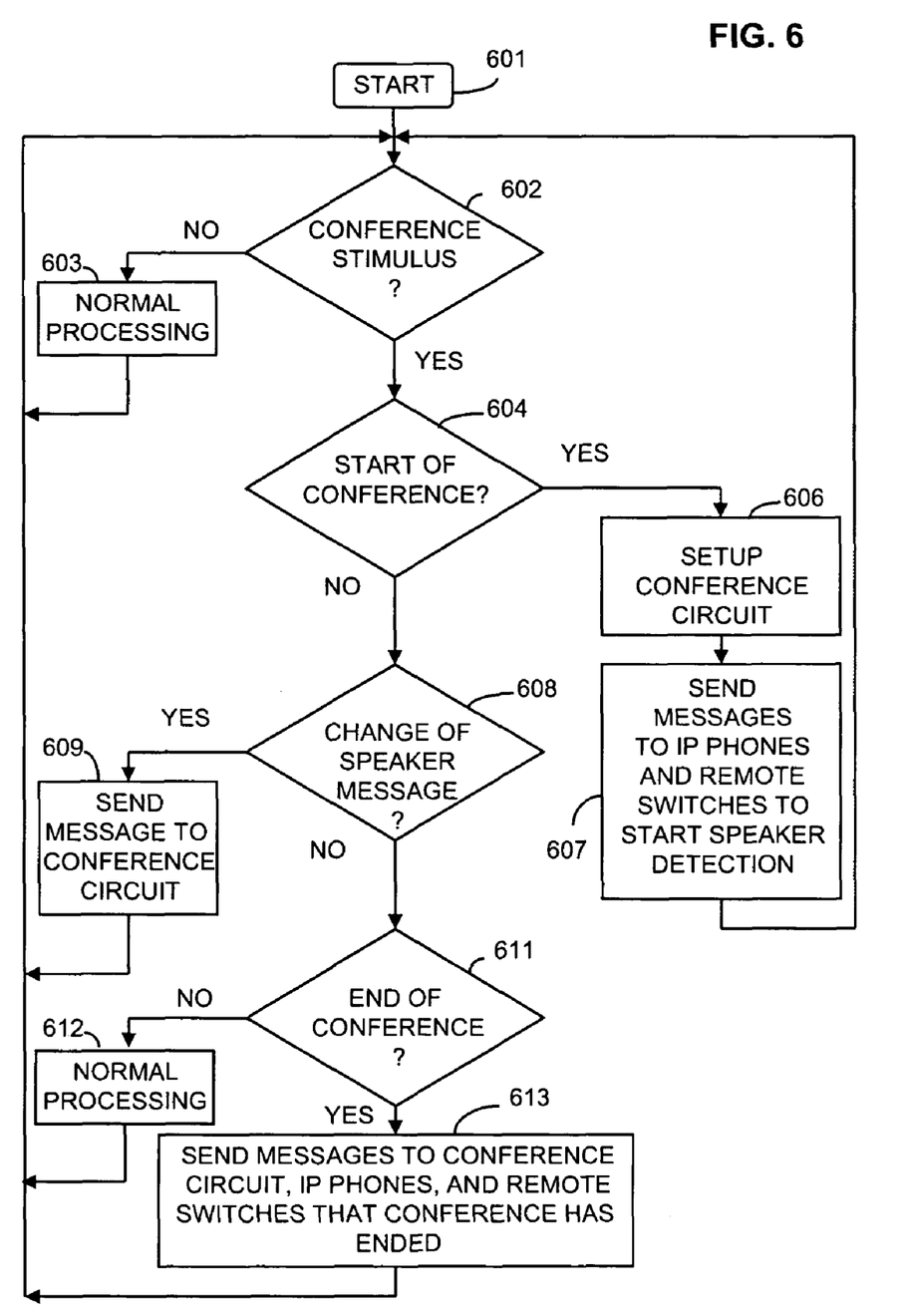
FIG. 6 illustrates, in flowchart form, an embodiment of operations performed by a telecommunication terminal or remote switching system in accordance with the invention.

FIG. 6 illustrates, in flowchart form, an embodiment of operations performed by a telecommunication central controller such as controller 122 of FIG. 1 or gateway 401 of FIG. 4. After being started in block 601, decision block 602 determines if there is any type of a stimulus relating to a conference. This may be a handset requesting that a conference be set up or may be information being transmitted from telephone sets or remote switches that are already engaged in a conference. If the answer in decision block 602 is no, block 603 performs normal processing before returning control back to decision block 602. If the answer in decision block 602 is yes, decision block 604 determines if this is an indication of a telephone set wishing to start a conference. If the answer is yes, control is transferred to block 606 which sets up conference circuit 120 or 418 to establish the conference. Note, that the setting up of the conference performed by block 606 will also involve adding the other telephone sets that are to be part of the conference to the conference circuit. After execution of block 606, control is transferred to block 607 which sends messages to the IP telephones that are part of the conference and remote switches which have telephones associated with the conference to start performing the speaker detection routine. The speaker detection routines determine when a speaker has changed. After execution of block 607, control is returned back to decision block 602.

Returning to decision block 604, if the answer is no, decision block 608 determines if a speaker change message has been received from an IP telephone or a remote switch. If the answer is yes, block 609 sends a message to the conference circuit advising it to perform speaker recognition on the telephone set that has indicated the change of speaker before returning control to decision block 602. If the answer in decision block 608 is no, decision block 611 determines if the conference has been terminated. The conference can be terminated in many systems by the telephone set that set up the system disconnecting, or all of the telephone sets can simply disconnect. If the answer is no in decision block 611, block 612 performs normal processing before returning control back to decision block 602.

Returning to decision block 611, if the answer is yes that the conference is ending, block 613 sends messages to the conference circuit, IP phones, and remote switches which are part of the conference that the conference has ended before transferring control back to decision block 602.

Figure 7:
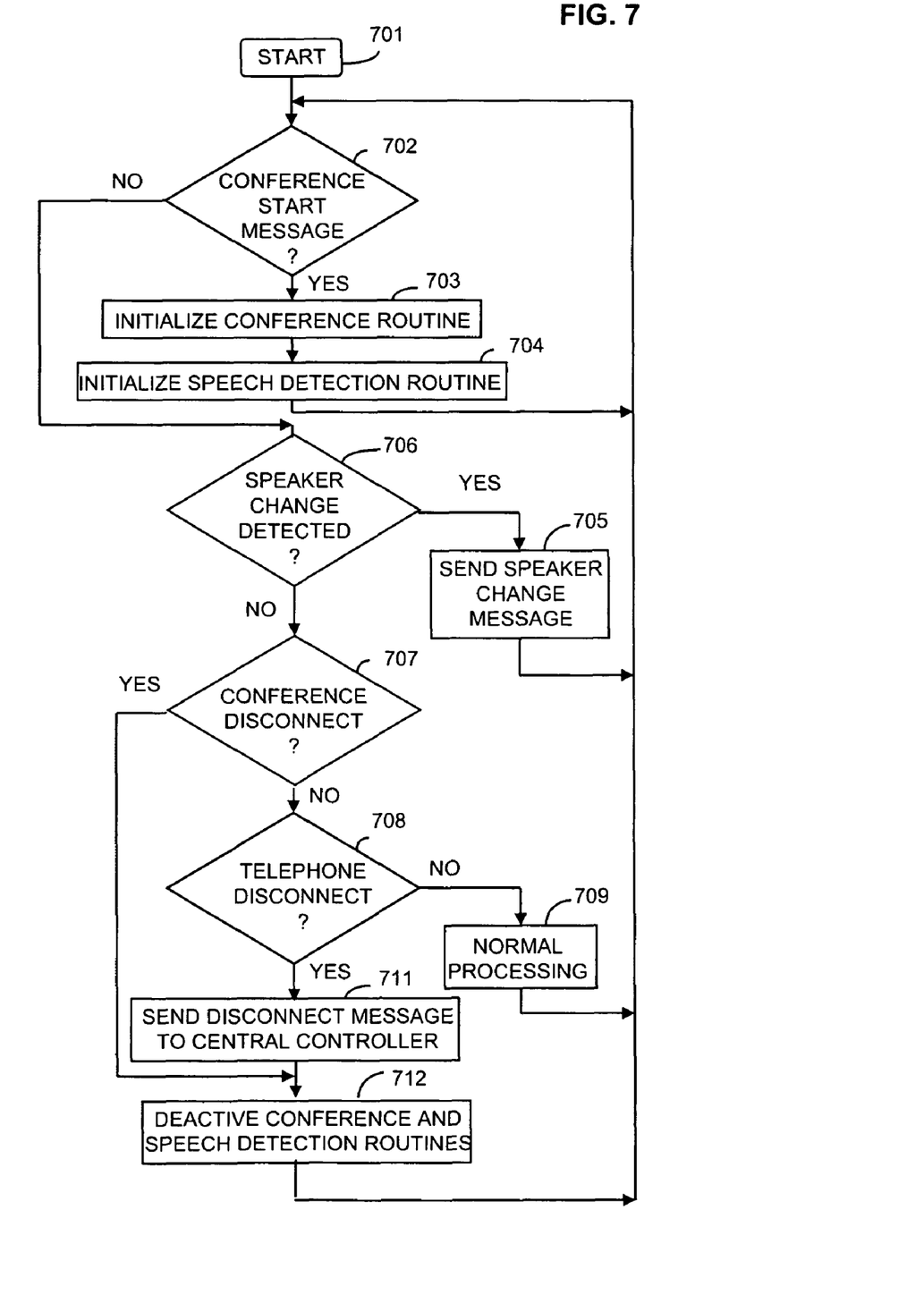
FIG. 7 illustrates, in flowchart form, an embodiment of operations performed by a telecommunication switching system in accordance with the invention.

FIG. 7 illustrates, in flowchart form, operations performed by an embodiment of an IP telephone in implementing the invention. After being started by block 701, decision block 702 determines if a conference start message has been received from a central controller. In another embodiment, the IP telephone could also detect that a conference had started by the use of its own speakerphone and would signal the central controller. If the answer is yes in decision block 702, block 703 initializes the conference control routine, and block 704 initializes the speech detection control routine before returning control back to decision block 702.

Returning to decision block 702, if the answer is no in decision block 702, control is transferred to decision block 706. Decision block 706 determines when a speaker change has occurred at the IP telephone set. This change is determined by the speaker detection routine 205 of FIG. 2. If the answer is yes in decision block 706, control is transferred to block 705 which sends a speaker change message to the central controller before returning control back to decision block 702.

If the answer in decision block 706 is no, control is transferred to decision block 707 which determines if a conference disconnect message has been received from the central controller. If the answer is yes, control is transferred to block 712 which deactivates the conference and speech detection control routines before transferring control back to decision block 702. Note, that when the conference ends, the individual or individuals utilizing the IP telephone will become aware of this because of a silence in the conversation.

Returning to decision block 707, if the answer is no in decision block 707, control is transferred to decision block 708. Decision block 708 determines if the IP telephone itself has disconnected from the conference call. If the answer is no, control is transferred to block 709 which performs normal processing before returning control back to decision block 702. If the answer is yes in decision block 708, block 711 sends a disconnect message to the central controller before transferring control to block 712.

Figure 8:
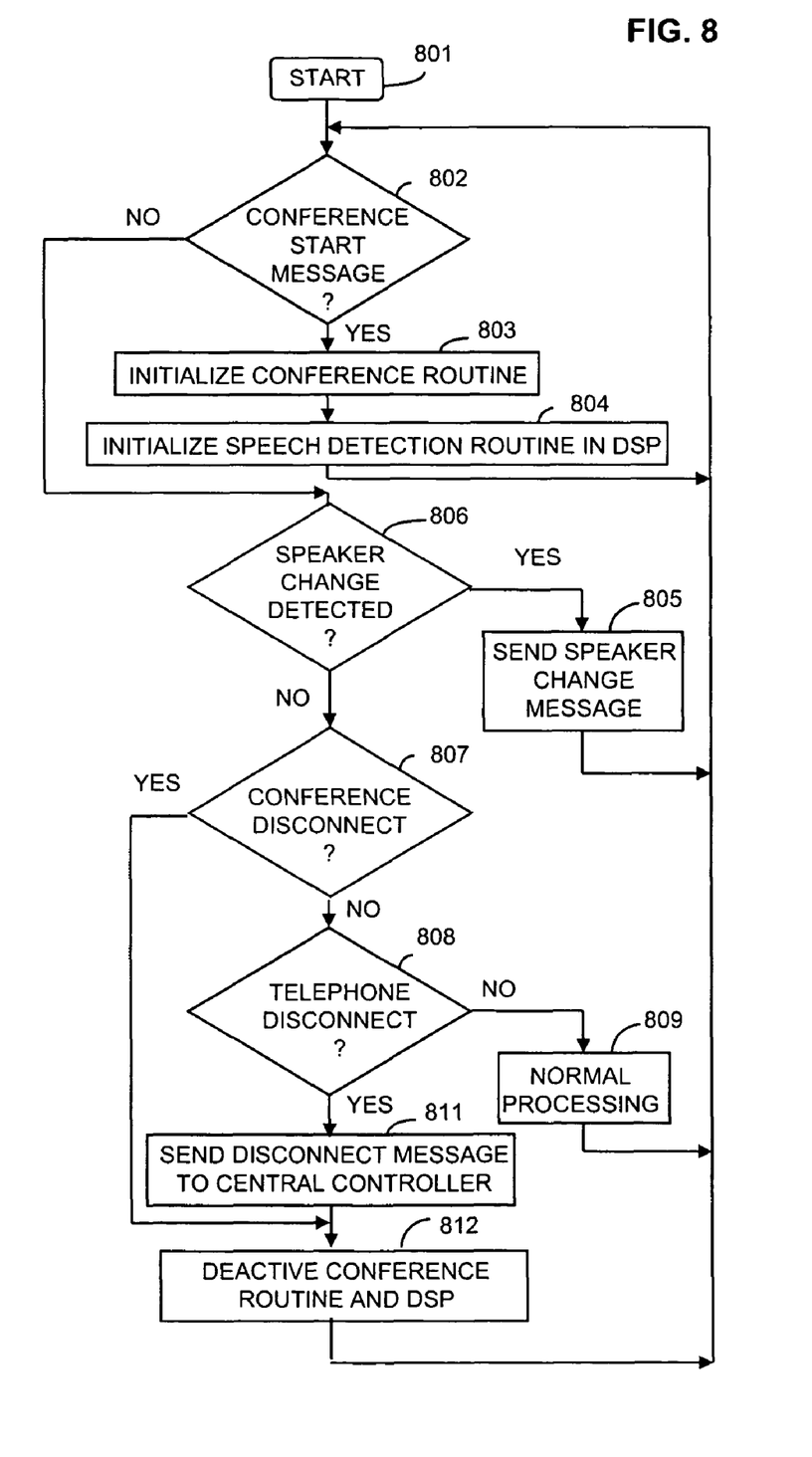
FIG. 8 illustrates, in flowchart form, an embodiment of operations performed by a gateway in accordance with the invention.

FIG. 8 illustrates, in flowchart form, operations performed by an embodiment of a remote switch in implementing the invention. After being started by block 801, decision block 802 determines if a conference start message has been received from a central controller. If the answer is yes in decision block 802, block 803 initializes the conference control routine, and block 804 initializes the speech detection control routine in the DSP before returning control back to decision block 802.

Returning to decision block 802, if the answer is no in decision block 802, control is transferred to decision block 806. Decision block 806 determines when a speaker change has occurred as detected by the DSP. This change is determined by the speaker detection routine 314 of FIG. 3. If the answer is yes in decision block 806, control is transferred to block 805 which sends a speaker change message to the central controller before returning control back to decision block 802.

If the answer in decision block 806 is no, control is transferred to decision block 807 which determines if a conference disconnect message has been received from the central controller. If the answer is yes, control is transferred to block 812 which deactivates the conference control routine and speech detection control routine in the DSP before transferring control back to decision block 802.

Returning to decision block 807, if the answer is no in decision block 807, control is transferred to decision block 808. Decision block 808 determines if a telephone connected to the remote switch has disconnected from the conference call. If the answer is no, control is transferred to block 809 which performs normal processing before returning control back to decision block 802. If the answer is yes in decision block 808, block 811 sends a disconnect message to the central controller before transferring control to block 812.

When the operations of an telecommunication terminal, gateway, controller, CPU or computer are implemented in software, it should be noted that the software can be stored on any computer-readable medium for use by or in connection with any computer related system or method. In the context of this document, a computer-readable medium is an electronic, magnetic, optical, or other physical device or means that can contain or store a computer program for use by or in connection with a computer related system or method. The telecommunication terminal, gateway, controller, CPU or computer can be embodied in any computer-readable medium for use by or in connection with an instruction execution system, apparatus, or device such as a computer-based system, processor-containing system, or other system that can fetch the instructions from the instruction execution system, apparatus, or device and execute the instructions. In the context of this document, a "computer-readable medium" can be any means that can store the program for use by or in connection with the instruction execution system, apparatus, or device. For example, the computer-readable medium can be, but is not limited to, an electronic, magnetic, optical, electromagnetic, infrared, or semiconductor system, apparatus, or device. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical).

In an alternative embodiment, where the telecommunication terminal, gateway, controller, CPU or computer is implemented in hardware, telecommunication terminal, gateway, controller, CPU or computer can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Of course, various changes and modifications to the illustrated embodiments described above will be apparent to those skilled in the art. These changes and modifications can be made without departing from the spirit and scope of the invention and without diminishing its intending advantages. It is therefore intended that such changes and modifications be covered by the following claims except insofar as limited by the prior art.

What is claimed is:

1. A method for performing participant identification in a conference of a plurality of participants, comprising the steps of:
   performing a simple speech algorithm to detect a change in an active participant among a set of the plurality of participants using an endpoint telecommunication unit by the endpoint telecommunication unit whereby the speech algorithm only determines the change in the active participant and not the identity of the active participant;
   signaling the detected change to a system controller that is providing overall control of a telecommunication switching system which comprises the endpoint telecommunication unit and a conference unit by the endpoint telecommunication unit by transmission of a message whereby the conference unit is combining the audio information from the plurality of participants;
   transmitting another message by the system controller to the conference unit by the system controller to inform the conference unit of the detected change; and
   determining in response to the other message the identity of a new active participant of the set of the plurality of participants by the conference unit performing voice recognition to identify the new active participant in response to the signaled change whereby the conference unit processes speech information from only the endpoint telecommunication unit.

2. The method of claim 1 wherein the endpoint telecommunication unit is a telecommunication terminal.

3. The method of claim 1 wherein the endpoint telecommunication unit is a remote switch connecting a telecommunication terminal used by a subset of the set of the plurality of participants to the conference unit.

4. The method of claim 1 wherein the step of detecting comprises determining a use of a speakerphone on the endpoint telecommunication unit.

5. A system for providing a conference, comprising:
   a conference unit which is combining the audio information from the plurality of participants of the conference;
   a system controller that is providing overall control of a telecommunication switching system which comprises the conference unit and a plurality of endpoint telecommunication units;
   system controller establishing the conference for a set of participants using a plurality of endpoint telecommunication units;
   one of the plurality of endpoint telecommunication units providing service for a subset of the set of the plurality of participants, performing a simple speech algorithm to detect a change in a new active participant of the subset of the set of the plurality of participants whereby the speech algorithm only determines the change in the active participant and not the identity of the active participant and signaling the change to the system controller by transmission of a message;
   system controller responsive to the signaled change to request the conference unit identify the new active participant of the subset of the set of the plurality of participants; and
   the conference unit identifying the new active participant by performing voice recognition to identify the new active participant and signaling the identity to the system controller.

6. The system of claim 5 wherein the one of the plurality of endpoint telecommunication units is a telecommunication terminal.

7. The system of claim 5 wherein the one of the endpoint telecommunication units is a remote switch connecting a telecommunication terminal used by a subset of the set of the plurality of participants to the conference unit.

8. A non-transitory computer-readable medium comprising computer-executable instructions which, when executed by a processor, perform the steps of:
   performing a simple speech algorithm to detect a change in an active participant among a set of the plurality of participants using an endpoint telecommunication unit by the endpoint telecommunication unit whereby the speech algorithm only determines the change in the active participant and not the identity of the active participant;
   signaling the detected change to a system controller that is providing overall control of a telecommunication switching system which comprises the endpoint telecommunication unit and a conference unit by the endpoint telecommunication unit by transmission of a message whereby the conference unit is combining the audio information from the plurality of participants of the conference;
   transmitting another message by the system controller to the conference unit to inform the conference unit of the detected change; and determining in response to the other message the identity of a new active participant of the set of the plurality of participants by the conference unit performing voice recognition to identify the new active participant in response to the signaled change whereby the conference unit processes speech information from only the endpoint telecommunication unit.

9. The non-transitory computer-readable medium of claim 8 wherein the endpoint telecommunication unit is a telecommunication terminal.

10. The non-transitory computer-readable medium of claim 8 wherein the endpoint telecommunication unit is a remote switch connecting a telecommunication terminal used by the set of the plurality of participants to the conference unit.

11. The non-transitory computer-readable medium of claim 8 wherein the endpoint telecommunication unit is a speakerphone on the endpoint telecommunication unit.

* * * * *